United States Patent
Culkin

(10) Patent No.: US 6,275,270 B1
(45) Date of Patent: *Aug. 14, 2001

(54) VIDEO DISPLAY AND IMAGE INTENSIFIER SYSTEM

(75) Inventor: Joseph Bradley Culkin, Emeryville, CA (US)

(73) Assignee: Calvest Associates, Inc., Stateline, NV (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/692,455

(22) Filed: Aug. 5, 1996

Related U.S. Application Data

(63) Continuation-in-part of application No. 08/377,282, filed on Jan. 23, 1995, now Pat. No. 5,543,862.

(51) Int. Cl.[7] .......................................................... H04N 5/74
(52) U.S. Cl. ........................... 348/739; 348/777; 348/756; 348/779; 313/524; 313/526
(58) Field of Search ................................... 348/777, 779, 348/739, 756, 796; 313/526, 524

(56) References Cited

U.S. PATENT DOCUMENTS

| | | | |
|---|---|---|---|
| 2,888,513 | * 5/1959 | Melamed et al. | 348/777 |
| 3,152,222 | * 10/1964 | Loebner | 348/777 |
| 3,757,351 | * 9/1973 | Simms | 347/121 |
| 3,864,595 | * 2/1975 | Lawrence et al. | 315/12 |
| 4,714,956 | * 12/1987 | Yin | 348/777 |
| 5,233,183 | * 8/1993 | Field | 250/214 |
| 5,543,862 | * 8/1996 | Culkin | 348/739 |
| 5,742,115 | * 4/1998 | Gertsenshteyn | 313/365 |

* cited by examiner

Primary Examiner—Reinhard J. Eisenzopf
Assistant Examiner—Linus H. Lo
(74) Attorney, Agent, or Firm—Theodore J. Bielen, jr.

(57) ABSTRACT

A video display system utilizing a video source and an image intensifier having a substrate. A video image source positions at the substrate to provide a photon signal. A photocathode element at the substrate converts the photon signal into electrons. An optically transparent body having first and second surfaces is placed opposite the substrate spaced therefrom. A vacuum chamber is formed between the substrate and the first surface of the second optically transparent body. A fluorescing layer is positioned on said first surface of the second optically transparent body. A source of electrical power provides a voltage potential between the photocathode layer and said fluorescing layer. The intensified video image exits the second surface of the second optically transparent body for viewing.

10 Claims, 10 Drawing Sheets

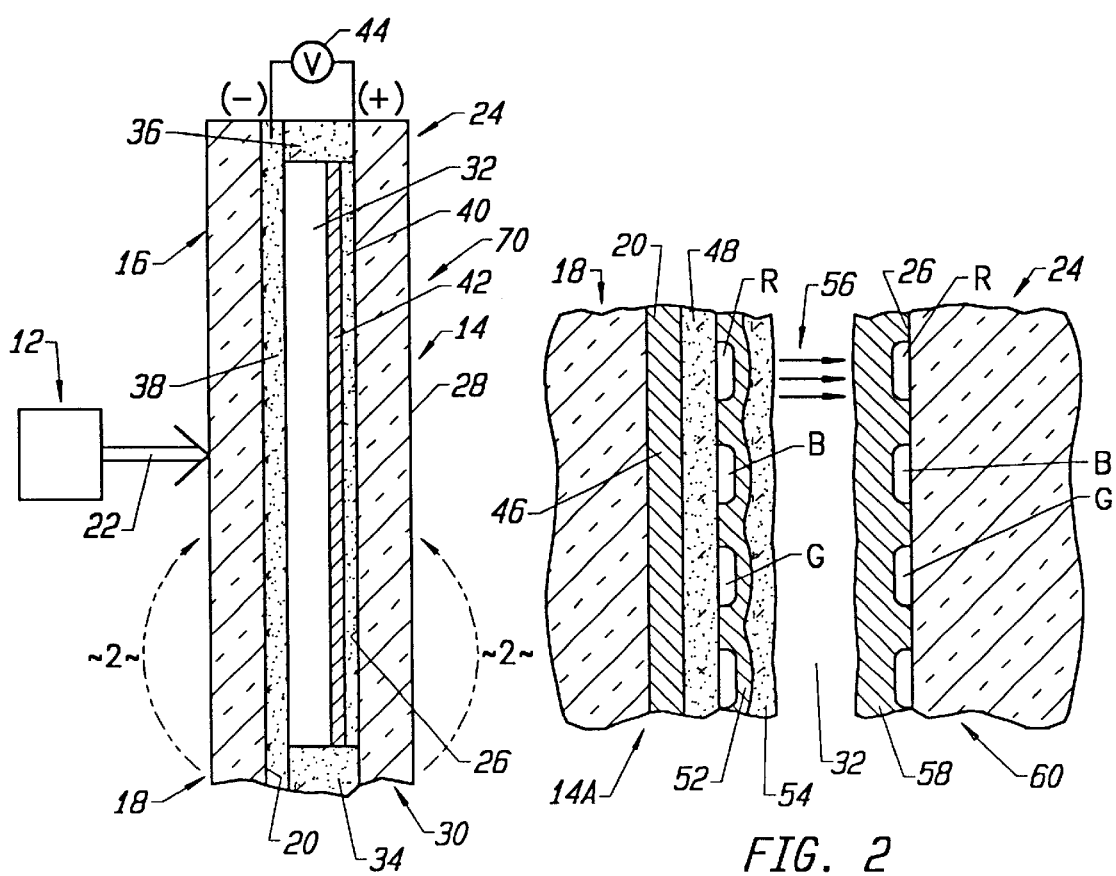
FIG. 1
FIG. 2
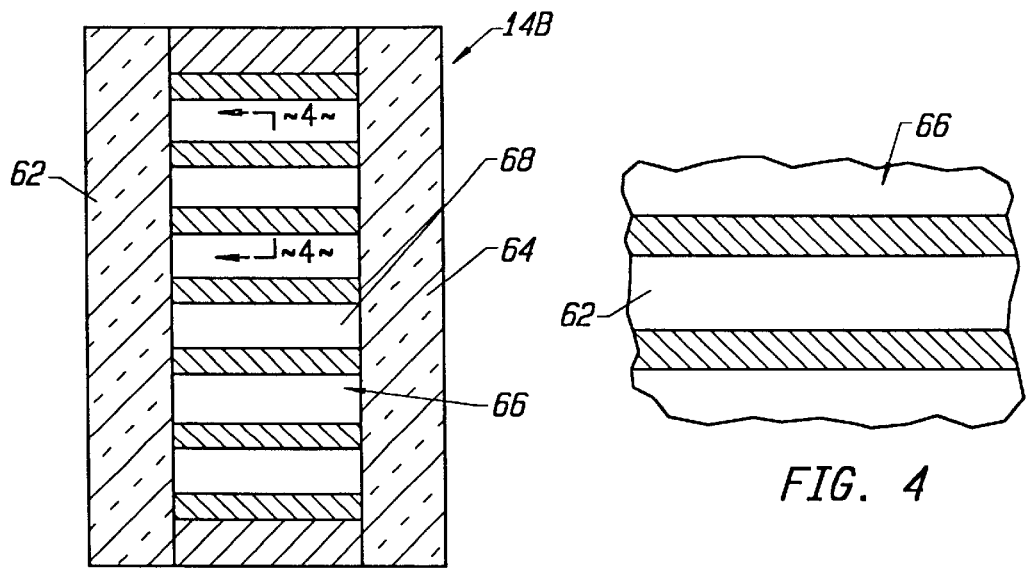
FIG. 3
FIG. 4

VIDEO DISPLAY AND IMAGE INTENSIFIER SYSTEM

CROSS-REFERENCES TO RELATED APPLICATIONS

The present application is a continuation-in-part application of U.S. application Ser. No. 08/377,282, Filed Jan. 23, 1995, now is U.S. Pat. No. 5,543,862.

BACKGROUND OF THE INVENTION

The present invention relates to a novel and useful video display system.

Presently, producing video images is chiefly accomplished by the use of a cathode ray tube. Although successful in many aspects of the video technology, cathode ray tubes possess a number of disadvantages in that cathode ray tubes are not easily scaled upwardly in size. This is due to the fact that the weight of the vacuum tube becomes unmanageable with an increase in size, commensurate with a large increase in the cost of manufacture. However, cathode ray tubes produce a very high quality video image, via the fluorescing or phosphor display. Moreover, cathode ray tubes exhibit high brightness, speed, contrast, resolution, and color purity.

Liquid crystal displays (LCD) are lightweight and are capable of producing a video image on a flat screen. Unfortunately, the LCD technology produces a video image of low brightness, low efficiency, and low color purity, which has been described as a "washed-out" look. In addition, the LCD video image possesses low resolution and is not susceptible to wide-angle viewing since the Lambertian effect is not inherent in LCD displays. Moreover, LCDs are slow to display an image and are not cost effective.

Image intensifiers have been proposed such as that found in U.S. Pat. No. 5,029,009 where light is passed through a lens to focus the same onto a substrate having an array of gating electrodes, mounted thereupon. An electrode array and substrate are transparent to light in order to allow the light to pass to a photocathode. Thus, adaptive range gating is accomplished using a single imaging camera.

U.S. Pat. No. 3,864,595 describes an image intensifier tube having a photocathode element which converts incident radiation into corresponding electron images. A microchannel plate multiplies the electron image and sends the same to a phosphor screen to convert the electron image to a corresponding radiation image for viewing. The electron image is easily turned "on" and "off" by selectively applying a gating signal to the photocathode element.

U.S. Pat. No. 4,142,123 describes an image display device utilizing a photocathode, multiplier diodes, and an anode electrode in a cathode luminescent screen. The anode electrode is constructed of a material which exhibits slow fluorescence to permit emission of light energy after excitation has ceased. Electrons created in the discharge strike of the anode electrode are directed to the photocathode where they are converted into free electrons. Rapid initiation of subsequent electrical discharges is ensured by such free electrons.

U.S. Pat. No. 5,160,565 describes an image intensifier utilizing a fiber optic bundle which receives an image at one end and produces an intensified image at the other end of the bundle.

U.S. Pat. No. 3,742,285 teaches an image intensifier display system where a display tube having a fiber optic input window includes an electron emitting surface. Electrons impinge on a display window of larger diameter having a phosphor coated surface to provide a magnified image of a scene being viewed.

U.S. Pat. No. 4,694,171 describes an electron microscope imaging system which employs an image intensifier which receives light emitted from an image that is excited by an electron beam.

U.S. Pat. No. 4,213,055 shows an image intensifier tube which utilizes an entrance detection screen mounted in an envelope adjacent to an entrance window. An electron optical system also mounted in the envelope images electrons which pass to an exit screen in the envelope, resulting in a viewable video image.

U.S. Pat. No. 4,974,089 teaches a television camera in which an index rod lens is employed to relay a light image from an image intensifier to a filter which is coupled to a focal plane array assembly.

U.S. Pat. No. 3,757,351 illustrates an electrostatic printing system where light is reflected from a document, passed through a lens, and intensified by a container having a photocathode placed on a glass substrate. The cathode converts the photon image to an electron image which then passes through a microchannel plate and sends the image to a dielectric target in the form of an electro static charge. The electro static charge is then used to print a document.

A video display system which is capable of intensifying an image from a video source accurately and efficiently to produce a video display of very high quality would be a notable advance in the electronics field.

SUMMARY OF THE INVENTION

In accordance with the present invention, a novel and useful video display system is herein provided.

The video display system of the present invention utilizes a video image source which may take the form of a photocathode ray tube combined with an enlarging or focusing lens, a liquid crystal projector, and the like. Video image source may be monochromatic or simple non-color source. In addition, the video source may include video position data in the form of columns or rows, simple video intensity data, or a combination of any of these.

The display system of the present invention also includes an image intensifier unto which the video image source is remotely projected or is transferred by close coupling. In the former case, projection may be accomplished by employing a cathode ray tube as the video image source. In addition, projecting of the video image may take place by employing a liquid crystal display spacial light modulator combined with a point source of light. Any other suitable projecting arrangement may be employed herewith.

The video intensifier of the system of the present invention may be constructed with a first optically transparent body or panel which may be constructed of glass, crystalline material, or any other suitable transparent substance. The optically transparent body would include a first side and a second side. The video image source would be delivered to the first side of the optically transparent body either by projecting the same or through close coupling.

A photocathode layer is placed or positioned on the second side of the first optically transparent body. The photocathode layer may be constructed of any material which will convert photons to electrons. For example, multi-alkali type material such as a sodium, potassium, antimony, cesium compounds, a cesium silver oxide compound, and the like.

Alternately, the photon signal may be converted into electrons by providing a substrate in association with a video image source. The substrate may be an optically opaque body. Photocathode elements or a photocathode layer are formed adjacent the video image source for converting the photon signal of the video image source to electrons. This arrangement may also include photon baffles and channel multipliers, which eliminates the need for metallic coating on the fluorescing layer.

The image intensifier is also provided with a second optically transparent body which may be of the same structure as the first optically transparent body. Of course, the second optically transparent body may comprise the sole optically transparent body when used with the opaque substrate. Likewise, the second optically transparent body possesses a first side and a second side.

A fluorescent layer, which may be a phosphor material, is positioned on the first side of the second optically transparent body. The fluorescing material forming the fluorescing layer is capable of transforming electrons, emanating from the photocathode layer positioned on the second side of the first optically transparent body or from the photocathode elements adjacent the video image source, into photons. Photons are then transmitted through the second optically transparent body for viewing. The fluorescing layer may be in the form of phosphor dots and include a protecting layer of metallic material, such as aluminum, to prevent photons from returning to the photocathode layer on the second side of the first optically transparent body. Although the image viewed on the second side of the second optically transparent body may be monochromatic, a suitably addressed color fluorescing type material on the first side of the second optically transparent body would create a color image employing methods known in the prior art. The aluminum layer on the second optically transparent body is not necessary where baffles and channel multipliers are employed with the photocathode elements and an opaque substrate.

Chamber means is also provided for forming a vacuum enclosure between the second side of the first optically transparent body and the first side of the second optically transparent body. Thus, electrons emanating from the photocathode layer may easily accelerate in the vacuum enclosure formed between the first and second optically transparent bodies. An insulating matrix may be employed to strengthen or reinforce the vacuum enclosure space to prevent collapse of the same under high vacuums. A seal would also be employed around the periphery of the vacuum enclosure as a portion of the chamber means. Such seal may be in the form of a frit seal.

A source of electrical power is also found in the present invention for applying a voltage potential between the photocathode layer of the first optically transparent body and the phosphor layer of the second optically transparent body. By this arrangement, the photocathode layer which serves as a cathode while the fluorescing or phosphor would serve as an anode. Such potential would intensify or provide a gain between the photocathode layer and the fluorescing layer. Moreover, grids or screens having a certain potential may be placed within the vacuum chamber and may be biased electrically to further influence electrons originating at the photocathode layer. A lesser amount of potential is required of the source of electrical power with the embodiment of the present invention using photocathode elements and an opaque substrate.

A color image viewed on the second side of the second optically transparent body may be obtained by projecting a color cathode ray tube image onto the first side of the first optically transparent body through a lens. The first side of the optically transparent body would include a plurality of color filters which would generate color image data of a particular hue at the photocathode layer found on the second side of the first optically transparent body. In addition, the fluorescing layer would include an array of fluorescing zones, each possessing the ability to stimulate the emission of a particular color therefrom. Thus, a color image would be derived from the second side of the second optically transparent body of greatly increased intensity. Of course, the color of such image would be commensurate with the color arrangement of the cathode ray tube, which is projected on the video intensifier.

In addition, a color image may be generated at the second side of the second optically transparent body using color data from a plurality of mono-chromatic cathode ray tubes and lenses. Thus, for example, red, blue and green data would be sent to the first side of the first optically transparent body of the image intensifier. An aperture mask would be placed on the first side of the image intensifier to intercept the distinct color data in order to separate the particular color rays at the photocathode layer on the second side of the first optically transparent body. At this point, color zones would be excited on the fluorescing layer on the first side of the second optically transparent body to produce the color image at the second side of the second optically transparent body.

Further, a monochrome system may be used with registration of input pixels on the photocathode layer to output pixels from the fluorescing layer of the image intensifier. Color data would necessarily be assigned to one third of the pixels for each color of a three color system.

Moreover, a hybrid system may be employed in which lines, columns or matrixes of photocathodes are optically addressed on the second side of the first optically transparent body. However, the current through the cathode, i.e., the photocathode layer, is modulated using triode biasing techniques. In the hybrid design, the image intensifier is merged with a "cold cathode" field emission design to obtain the best features of each.

Such hybrid designs permit the turning on of a line of photocathodes with optical excitation one line at a time, and then biasing those elements one column at a time using control grids placed in the vacuum enclosure of the image intensifier of the present invention. In addition, a row of discrete photocathodes may be excited and modulated with respect to potential column-wise, using electrodes perpendicular to a large area grounded grid. In essence, column and row addressing lines of photocathodes by optical means, coupled with electronic biasing produces the desired result, in this aspect of the present invention.

It may be apparent that a novel and useful video display system has been described.

It is therefore an object of the present invention to provide a video display system which would employ a remote or close coupled video image source with a video image intensifier to produce a viewable image of high brightness and high resolution.

Another object of the present invention is to provide a video display system that operates at high efficiency and is capable of outputting a video image which is monochromatic or color with excellent color purity.

A further object of the present invention is to provide a video display system which is lightweight and may be formed into a viewing screen of minimal depth.

A further object of the present invention is to provide a video display system which is capable of intensifying a monochrome video image of low brightness to produce a viewable color image of high brightness.

Another object of the present invention is to provide a video display system which is relatively inexpensive to manufacture.

A further object of the present invention is to provide a video display system which intensifies a video image from any video source including a source with a restricted viewing angle and produces a video display having wide angle viewing characteristics through a high speed conversion process.

Yet another object of the present invention is to provide a video display system which utilizes a video source of low quality and intensifies such video source into a video display of very high quality.

Another object of the present invention is to provide a video display system having a photocathode element which function without layer thickness limitations.

Another object of the present invention is to provide a video intensifier that obviates the need for a metallic shield on the fluorescing layer.

The invention possesses other objects and advantages especially as concerns particular characteristics and features thereof which will become apparent as the specification continues.

BRIEF DESCRIPTION OF THE DRAWINGS

FIG. 1 is a schematic sectional view showing an embodiment of the present invention with the video image source depicted in block diagram.

FIG. 2 is a schematic sectional view taken along line 2—2 of FIG. 1 depicting another embodiment of the video display system of FIG. 1 utilizing electroluminescent display columns at the photocathode layer and phosphor domains on the fluorescing layer.

FIG. 3 is a side view of another embodiment of the present invention in which separating posts are employed in the vacuum gap.

FIG. 4 is a sectional view taken along line 4—4 of FIG. 3.

Figure 5:
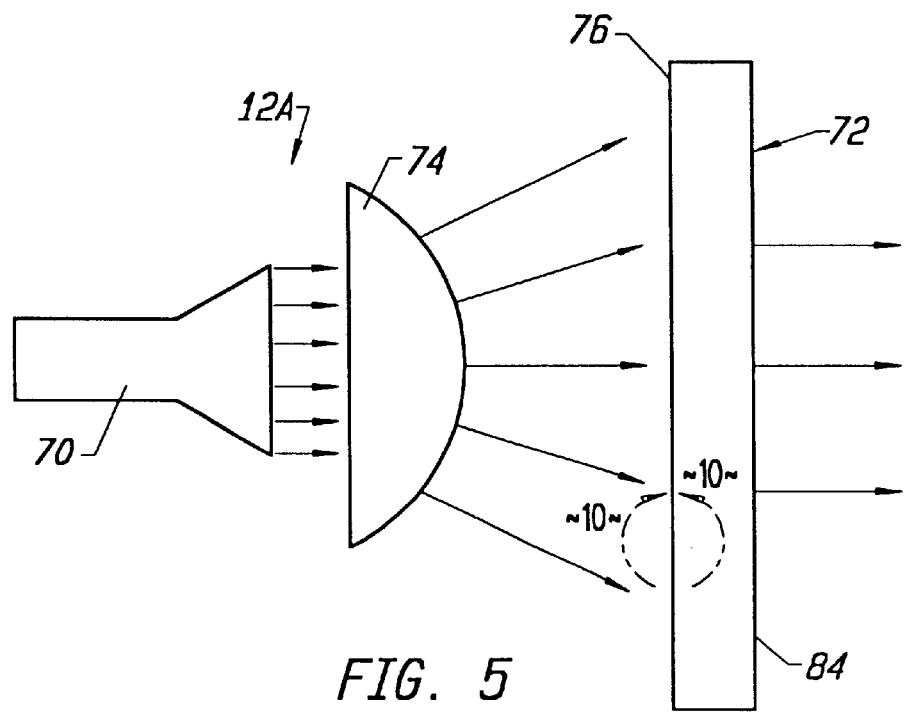
FIG. 5 is a schematic view depicting a remote projection version of the present invention using a cathode ray tube as the video image source of the present invention.

For a better understanding of the invention reference is made to the following detailed description of the preferred embodiments thereof which should be taken in conjunction with the hereinabove described drawings.

DETAILED DESCRIPTION OF THE PREFERRED EMBODIMENTS

Reference is made to the following Detailed Description of the Preferred Embodiments thereof which should be taken in conjunction with the prior described drawings.

With respect to FIG. 1, the invention 10 is shown in its broadest format in which a video source 12 is projected onto a video image intensifier 14. Although depicted schematically in the video display system 10, the video source 12 may be a cathode ray tube, a liquid crystal display, and the like which would be projected remotely onto the video image intensifier 14. In addition, the video image source 12 may be closely coupled to the video image intensifier 14. That is to say, a spacial light modulator or video display, such as an electroluminescent panel, plasma display, or the like may be placed in close contact with the video image intensifier. In addition, the video image source may be formed on the outer surface 16 of the video image intensifier in several ways, which will be discussed hereinafter. In essence, video source 12 may take the form of video position data and/or video intensity data.

Referencing FIGS. 1 and 2, image intensifier 14 includes a first optically transparent body 18 having a first side or surface 16 and a second side 20. The first optically transparent body 18 may be formed of glass, or other suitable crystalline material. Video source image 12 enters video image intensifier 14 through first outer surface 16, represented by directional arrow 22.

Second optically transparent body 24 includes a first surface 26 and a second opposite surface 28. Again, second optically transparent body 24 may be formed of the same material as first optically transparent body 18. Chamber means 30 is also included in the present invention for forming a vacuum space or enclosure 32 between first and second optically transparent bodies 18 and 24. Chamber means 30 includes peripheral seals, which may be frit seals 34 and 36. Vacuum enclosure 32 may be formed and sealed by optical bodies 18 and 24, as well as by seals 34 and 36, in order to create a relatively high vacuum in enclosure 32, on the order of $10^{-6}$ to $10^{-10}$ Torr.

The video display system 10 also includes as one of its elements, a photocathode layer 38 which is placed on second surface or side 20 of first optically transparent body 18. Photocathode layer 38 is capable of serving as a cathode for the purposes of emitting electrons through vacuum enclosure 32 upon the receipt of a photon signal from a video source 12. Photocathode layer 38 may take the form of cesium iodide, a sodium potassium, antimony, cesium compound, a silver cesium oxide compound and the like, which are commonly known in the art. The thickness of photocathode layer 38 has been enlarged for the purposes of emphasis in FIG. 1.

Fluorescing layer 40 is placed on first surface 26 of second optically transparent body 24. Fluorescing layer 40 may be a phosphor type material which is capable of receiving electrons and transducing the same into photons which would be visible as a video image on second surface 28 of second optically transparent body 24. Fluorescing layer 40 may be covered by a metallic coating 42 to prevent the return of photons from fluorescing layer 40 into vacuum enclosure 32. It should be apparent that metallic coating 42 is capable of passing electrons from vacuum enclosure 32 to phosphor or fluorescing layer 42. Fluorescing layer 40 and metallic coating 42 have likewise been enlarged on FIG. 1, for emphasis. Although depicted in its monochromatic format in FIG. 1, fluorescing layer 40 may include the provision of color video imagery, as will be discussed hereinafter.

Source of electrical power 44 places a potential between photocathode layer 38 (the cathode) and fluorescing or phosphor layer 40 (the anode). The effect of such a potential is to greatly accelerate electrons through vacuum enclosure 32 to the speed of approximately 10,000 electron volts. Source of electrical power 44 may be on the order of 1,000 to 10,000 volts. Grids may be placed in vacuum enclosure 32 to further bias the pull of electrons from photocathode layer 38 to fluorescing layer 40. A typical gain across vacuum enclosure 32 is one hundred or more based on a quantum efficiency of ten to fifty percent of the photocathode layer 38. Thus, one photon impinging on photocathode layer 38 will induce the emission of ten to several hundred photons at anode fluorescing layer 40. Although not absolutely necessary, the gain characteristic of the present invention is an important aspect, since the light production efficiency by electrons impacting fluorescing layer 42 is very high, typically 30 to 50 lumens per watt. This level of light production compares favorably with liquid crystal displays (1–5 lumens/watt) electroluminescent displays (1–5 lumens/watt) and other types of displays. By using a low brightness image source 12 and multiplying this source by several hundred times with intensifier 14, a very high overall efficiency of system 10 is obtained. Also, system 10 is relatively simple and inexpensive to build since an image source of high brightness and efficiency is not required in system 10. Combined with intensifier 14 a low cost, high brightness, and highly efficient display system 10 results.

Turning to FIG. 2, it may be observed that a detail is depicted in which an alternate intensifier embodiment 14A is shown having identical first and second optically transparent bodies 18 and 24. The embodiment in FIG. 2 is intended to produce a color image on second surface 28 of second optically transparent body 24. In this regard, a metallic (aluminum) back electrode layer 46 is depicted on surface 24 of body 18. Monochromatic electroluminescent phosphor 48 lies between aluminum back electrode 46 and indium tin oxide (ITO) electrodes 50, which are electronically color designated. It should be noted that the upper case letters R, B and G represent red, blue and green in FIG. 2. Dielectric layer 52 covers plurality of ITO electrodes 50, and is itself overlain by photocathode layer 54. Photoelectrons, directional arrows 56, impinge and pass through metallic layer 58, fluorescing plurality of phosphor dots 60 labeled R, B and G. Thus, a color image passes through second optically transparent body 24 for viewing.

FIGS. 3 and 4 represent a video image intensifier 14B having first and second optically transparent bodies 62 and 64, respectively. The photocathode and fluorescing layers have been omitted from FIG. 3 for the sake of simplicity. However, a plurality of ribbons 66 lies within vacuum enclosure 68 and spans the distance between first and second optically transparent bodies 62 and 64. Ribbons 66 protects video image intensifier 14b against bowing or collapse due to the vacuum within vacuum enclosure 68. Ribbons or spacers 66 may take the form of glass or similar dielectric material. For example, an artificial mica sold as "Cogemicanite", available from Cogebi of Dovers New Hampshire would suffice in this regard. This structure is particularly important when video image intensifier is large.

With reference to FIG. 5, it may be observed that the video image source 12A may be a cathode ray tube 70 which may project directly onto video intensifier 72, which is similar to video image intensifier 14, but will be detailed hereinafter with respect to FIG. 10. Cathode ray tube 70 may also project photons through lens 74 to enlarge the image on back surface 76 of video intensifier 72.

Figure 6:
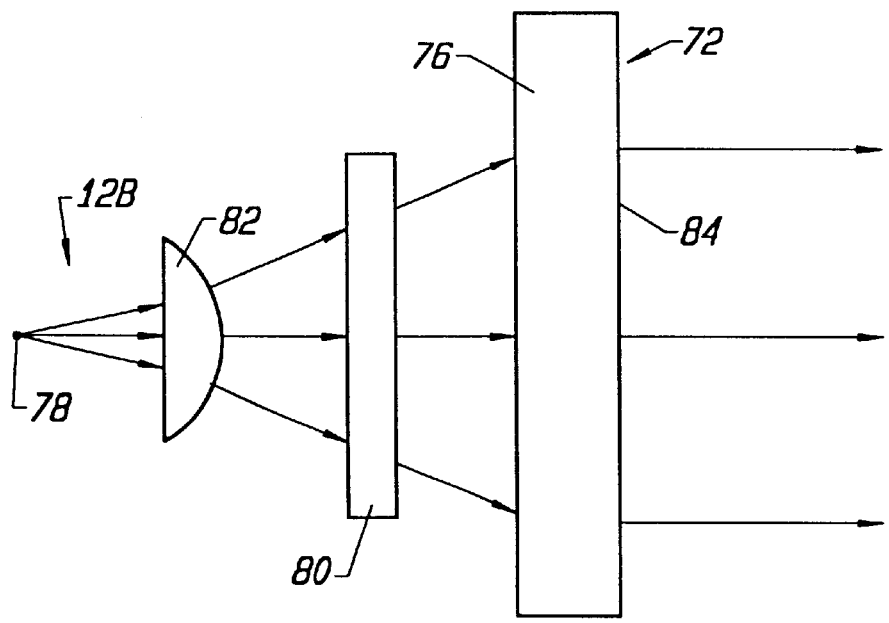
FIG. 6 is a schematic view of a remote projecting embodiment of the present invention in which a liquid crystal display spacial light modulator is used in conjunction with a point source of light.

Turning now to FIG. 6, it may be observed that another structure projecting video source 12B on intensifier 72 is depicted. The video source 12b is a point source of light 78 which is passed through a spacial light modulator 80 and then impinges on surface 76 of video intensifier 72. similarly, lens 82 may collate or focus the light from point source 78 prior to impinging on spacial light modulator 80. In either FIG. 5 or 6, the video image may be viewed on back surface 84 of intensifier 72.

Figure 7:
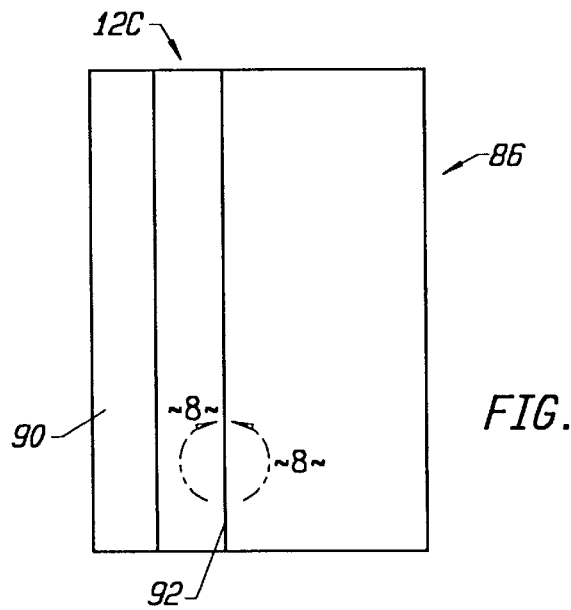
FIG. 7 is a schematic view depicting close coupling of the video image source to the image intensifier which employs a lambertian back light and a spatial light modulator.
Figure 8:
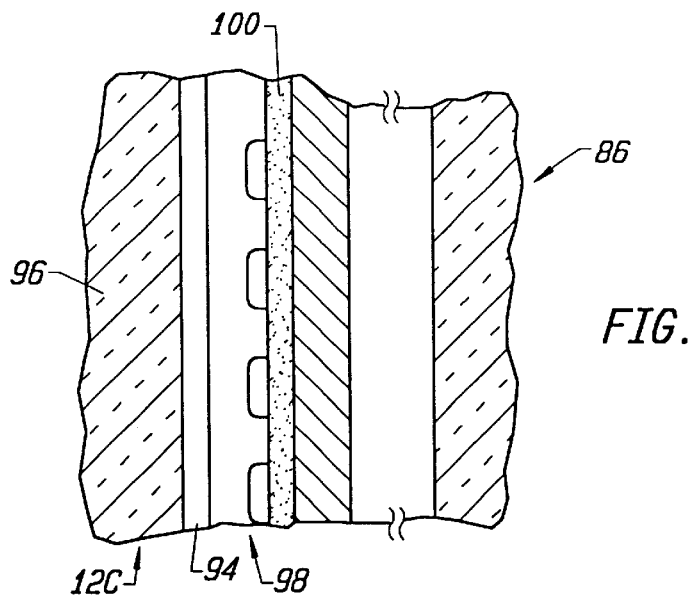
FIG. 8 is a magnified view taken along line 8—8 of FIG. 7 depicting a column and row pixel video image source in the close coupling arrangement shown in FIG. 7.

Referencing now FIG. 7, a structure for close coupling video source 12C to video intensifier 86 is depicted. Video source 12c includes a spacial light modulator (LCD) 88 which is sandwiched between a Lambertian back light 90 and the surface 92 of video intensifier 86. FIG. 8 depicts a detail of the close coupling depicted in FIG. 7 in which a "dynamic" display system is shown. In other words, light is generated by pixels rather than being modulated by a liquid crystal display. For example, in FIG. 8, pixel column pixel electrode 94 is depicted as being positioned against a transparent back plate 96. Plurality of row pixel electrodes 98 are fixed against a thin glass member 100 whose outer surface marks the line of demarcation between the video source 12C and intensifier 86. Thin glass plate 100 may be very thin, on the order of 2 mils. Thin glass plate 100 may also take the form of a fiber optic member. Moreover, the row and column addressing by row and column electrodes 94 and 98 may be a gas plasma display, or an electroluminescent display, of either a thin film AC, a thin film DC, or a thick film type.

Figure 9:
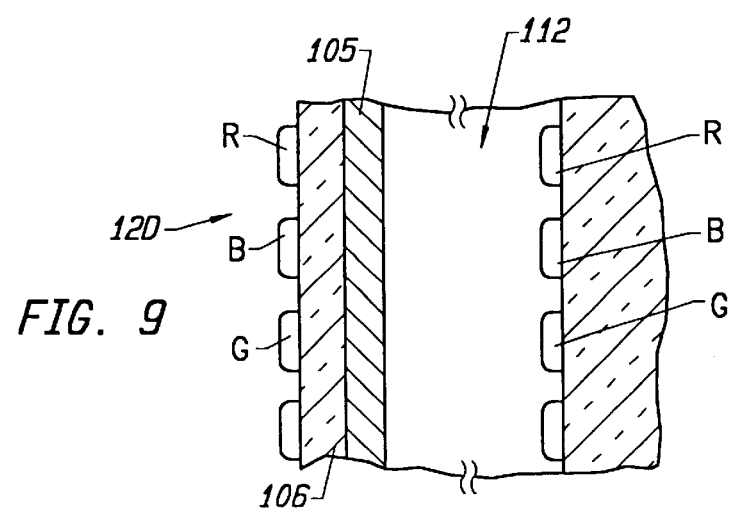
FIG. 9 represents a close coupled dynamic video image source in which the pixels are electroluminescent sources.

With respect to FIG. 9, close coupling is again illustrated in which video intensifier 104 is placed against thin glass plate 106, similar to thin glass plate 100 of FIG. 8, in which row of pixels 108 is placed against one side thereof. Line 110 marks the border between intensifier 104 and video source 12D.

Row of pixels 108 represent electronic addressing which derives from a monochromatic source. Such monochromatic source may be coupled in a 1 to 1 registration with color phosphor elements 112 found within intensifier 104. By way of example, the row of pixels or pixel dots 108 and phosphor columns or dots 112 are labeled with the upper case letter representations R, B, and G, to represent red, blue, and green. Again, pixels 108 may take the form of a gas plasma display, an electroluminescent (EL) panel, and the like. By using a gas plasma video image source, an ultraviolet light image generator would be formed in the embodiment shown in FIG. 9, if a suitable gas is chosen for the plasma display. A color video display result may be obtained in similar ways using the system of the present invention. The photons emitted by the photocathode layer 105 of intensifier 104 will be propelled directly to opposing anode pixel dots 112 since the random energy of photoelectrons streaming from photocathode layer 105 is less than one electron volt. Moreover, such photoelectrons experience an electric field of about 50,000 volts per centimeter directed perpendicularly to photocathode layer 105. Thus, alignment of the photons from image source 12 (by close coupling FIGS. 7–9), the corresponding photoelectron color domains of photocathode layer 105, and the corresponding color phosphor dots 112 is easily accomplished. In other words, a one-to-one registration between input pixels on photocathode layer 105 and output pixels 112 results. This occurs even at very high resolutions, e.g., 50 line pairs per millimeter or greater.

Figure 10:
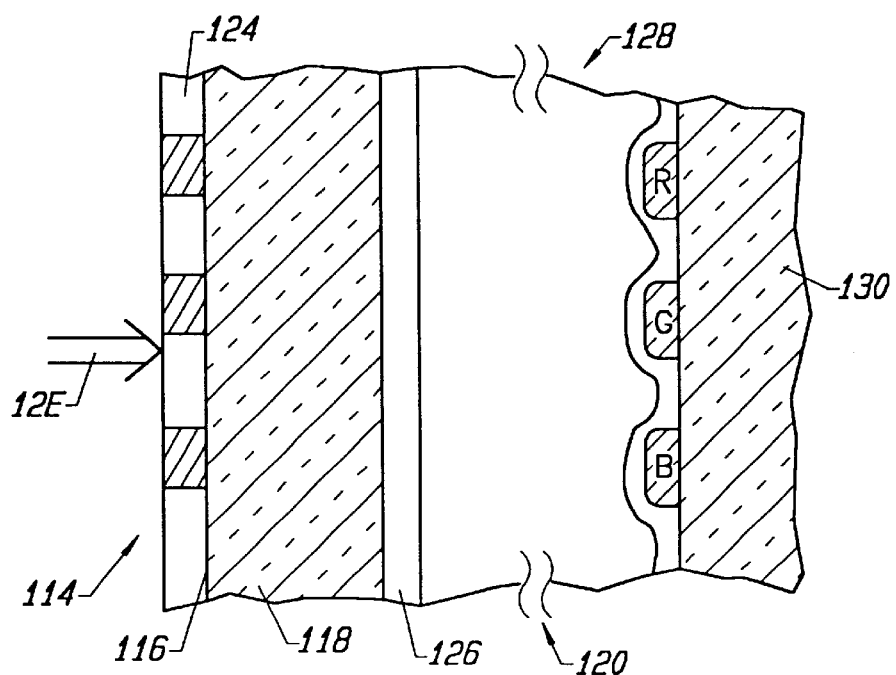
FIG. 10 is a schematic depicting the production of a color video display utilizing a plurality of color filters in conjunction with a plurality of color fluorescing domains.
Figure 11:
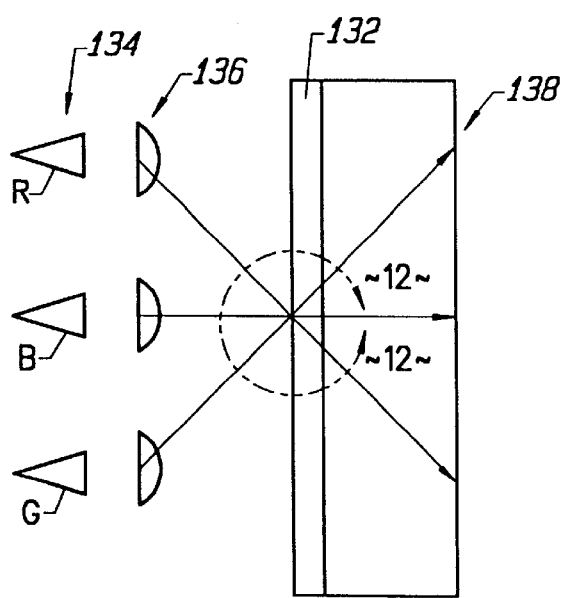
FIG. 11 is a schematic of another embodiment of the present invention used to produce a color video display employing an aperture mask in conjunction with the intensifier depicted in FIG. 1.
Figure 12:
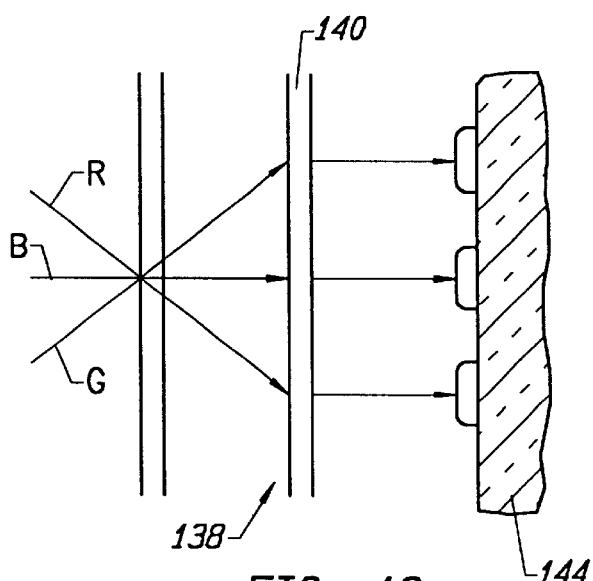
FIG. 12 is a sectional view taken along line 12—12 of FIG. 11 showing particulars of the aperture mask.

The present system 10 may produce a color video image in several ways, FIGS. 10–12. FIG. 10 represents a light source 12E that impinges on a plurality of color filters 114 placed against surface 116 of glass plate 118 which would serve as the first optically transparent body of intensifier 120. Line 122 marks the outer boundary of video intensifier 120. It should be noted that plurality of filters 114 are labeled Y, B, and G to represent colors yellow, blue, and green. Colors 114 are embedded in a film or other suitable holder 124. Photocathode layer 126 of intensifier 120 emits the photoelectrons and includes the same acceleration mechanism as shown with respect to video image intensifier 14 of FIG. 1. Pixels 128 are depicted in the form of phosphor dots labeled R, G, and B for the colors red, green, and blue. Phosphor pixels 128 lie on the surface of second optically transparent body 130 which corresponds to second optically transparent body 124 of FIG. 1. Thus, color image source 12E, such as that from a color cathode ray tube, passes through plurality of color filters 114 such that color image data from the plurality of filters 114 are transformed in to photoelectrons that hit the particular color photocathode phosphor dots or pixels, directly across vacuum space 32, on optically transparent body 130. Thus, color photon emission is stimulated, such that such photons pass through optical body 30 for viewing.

FIG. 11 represents another method of producing a color output from the system of the present invention in which an aperture mask 132 is employed. Plurality of CRTs 134 generate monochrome color data labeled R, B, and G for red, blue, and green. Multiplicity of lenses 136 intercept such light and create, for example, an all yellow light which passes through aperture mask 132 and then to a video intensifier 138 similar to intensifier 120 depicted in FIG. 10. Photocathode layer 140 emits photoelectrons which are accelerated directly to oppositely placed phosphor dots or pixels 142 on second optically transparent body 144.

Figure 15:
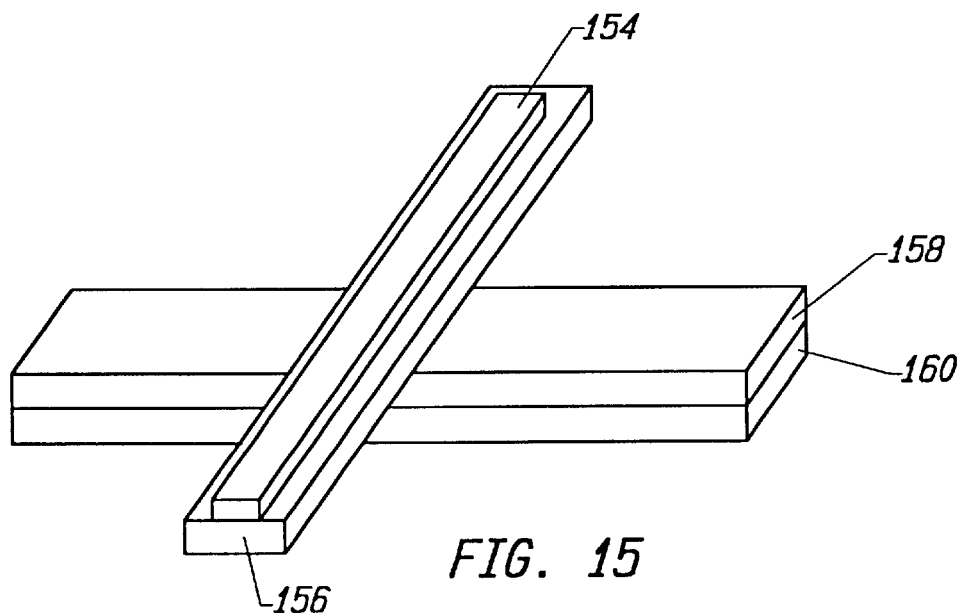
FIG. 15 is an isometric view of the photocathode strip and ITO strip depicted in FIG. 14 used in conjunction with the fluorescing domain found on a substrate.
Figure 14:
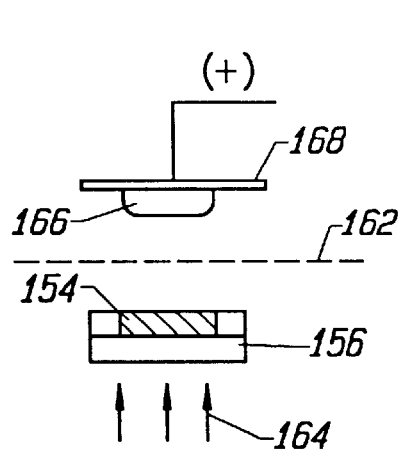
FIG. 14 depicts a sectional view of an ITO pixel in conjunction with a photocathode strip employed with a grid to modulate electrons impinging on a fluorescing domain.
Figure 13:
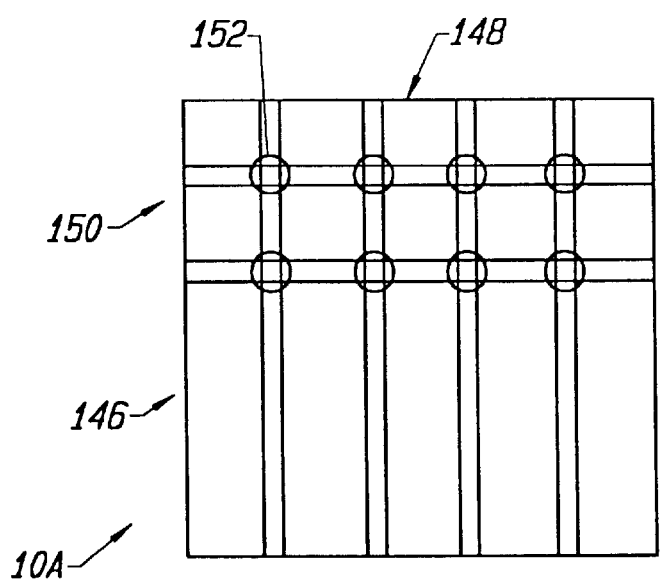
FIG. 13 is a elevational view of a hybrid system of the present invention utilizing lines of light in conjunction with ITO pixel strips.

FIGS. 13–14 represent a hybrid video display system 10A. FIG. 13 shows a flat panel display 146 in which optically transparent electrodes such as ITO electrodes covered by photocathode material are shown in columns 148 arranged vertically in FIG. 13 with optically emitting rows 150 arranged horizontally in FIG. 13. Such optically emitting rows 150 may take the form of electroluminescent devices, plasma devices, and the like, which are close coupled to column electrodes 148. In such a hybrid system 10A, enabling of lines of photocathodes is accomplished optically, but the resulting cathode current is modulated using triode biasing techniques. In such hybrid designs, there is a merger of the image intensifier design of FIG. 1 with cold cathode field emission designs, known in the art, to obtain the best features of each. For example, a group of photocathodes such as columns 148 may be optically excited, not over their overall dimension but one row at a time and then biased column-by-column with video data using voltage control. In addition, row 150 strips are excited to optically emit photons and the resulting photocathode currents are modulated column-wise using the perpendicular column electrodes 148 relative to a large area grounded grid. Moreover, pixel 152 illustrated in FIG. 13 represents the conflux of the optically transparent column electrodes (ITO electrodes) 148 coated with photocathode material and the optically emitting rows 150. FIG. 15 shows a detail of a pixel for hybrid system 10A in which photocathode strip 154 lies atop ITO strip 156. Perpendicular to the combined ITO and photocathode strips is a dielectric strip 158 underlain by photo emitting strip 160 to provide line addressing. With reference to FIG. 14, grid 162 is illustrated schematically. Plurality of arrows 164 represent photons from photo emitting strip 160 which impinges on ITO strip 156 and cathode 154 which, in turn, is driven with video data information as a low voltage. In this regard, each pixel formed by the combination depicted in FIG. 15 may be driven by low voltage, devices such as a CMOS driver. Phosphor domain or dot 166 is biased as an anode. When photocathode 154 is biased with respect to grid 162 in the plus direction, little current flows between cathode 154 and anode 168. However, when cathode element 154 is biased in a negative voltage with respect to grid 162 current copiously flows between photocathode 154 and anode 168, but only if strip 160 emits photons. The grid not shown in FIG. 13 or 15 would be a large area screen interposed anode and cathode, and is shown schematically in FIG. 14. Of course, the system depicted in FIG. 14 may be enlarged such that line addressing may include 500 electroluminescent, or plasma display drive circuits for the rows while column electrodes driven with video data by CMOS sample and hold elements may number 1500 columns.

Figure 16:
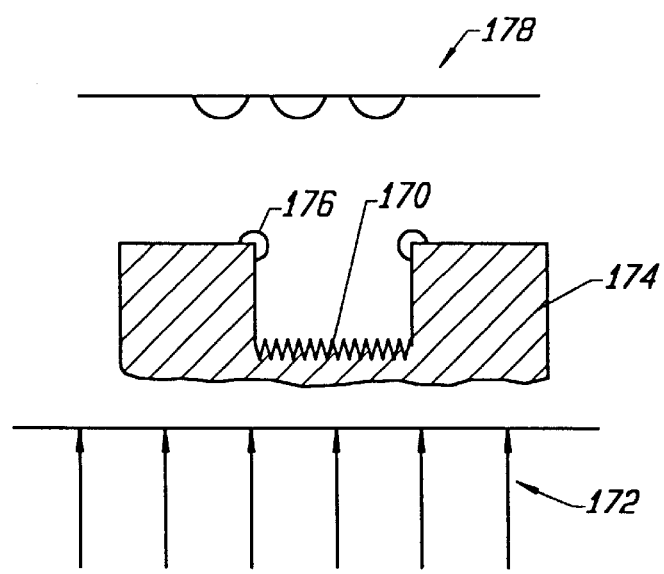
FIG. 16 is a sectional view showing a photocathode system used in substitution for an FED display.
Figure 18:
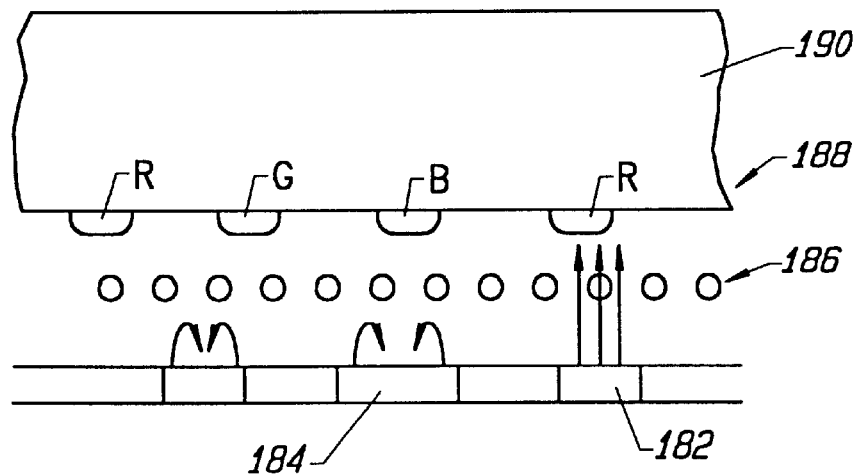
FIG. 18 is a schematic view of ITO electrodes employed on the photocathode layer modulated by an electrical grid to selectively scan one row of color fluorescing domains at a time.

FIG. 16 represents a field emission device (FED) type system of video production in which a photocathode 170 has been substituted for a typical FED. Large area back light 172 represented by a plurality of arrows is directed toward photocathode 170 which is recessed in a substrate 174. Grid 176 is modulated for appropriate video column data. In addition, phosphor dots 178 are modulated electrically for a particular line select capability.

Figure 17:
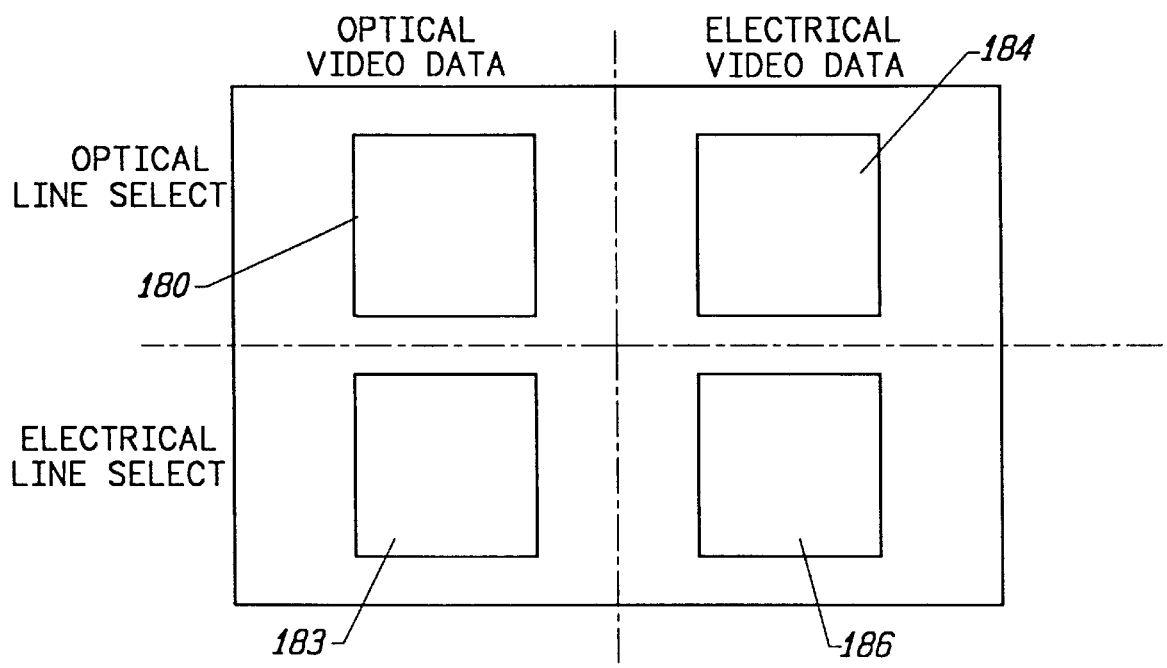
FIG. 17 is a schematic view depicting the possible combinations of optical and electrical data and line select combinations of the present invention.

FIG. 17 shows the various combinations of optical and electrical video column data and line selecting. The systems described in FIGS. 1–12 would be represented by box 180, because all of the video data is applied optically, i.e., one could view the image source as it appears either projected or close coupled to the photocathode of the intensifier. Box 184 would represent the system depicted in FIGS. 13–15, because line select data is inputted to the photocathode optically while column intensity data is introduced as a cathode bias voltage with respect to a grounded grid, while the combination shown in box 186 is the FED system of FIG. 16 with substituted photocathode 170. Box 183 is not shown herein, but would be an alternate version of the system of FIGS. 13–15 having the video data replaced by line select data and the line select data replaced by video data.

Figure 19:
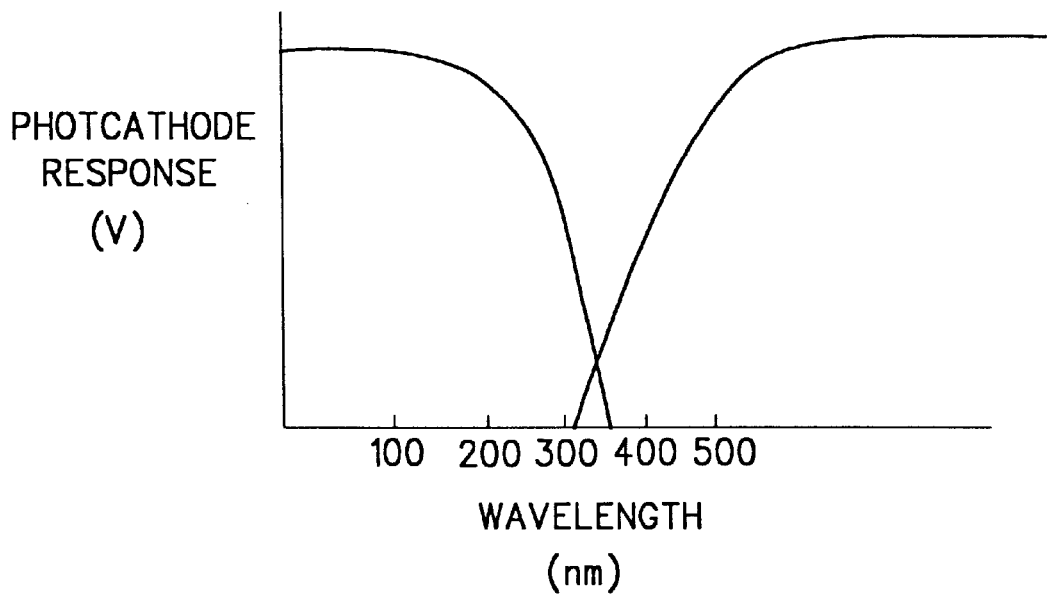
FIG. 19 is a graphical representation of quantum efficiency versus wave length depicting the disjointing of the video image source wavelengths from the phosphor emission wavelengths, thus illustrating the elimination of an aluminized coating on the fluorescing layer of the video intensifier where the photocathode layer is sensitive to ultraviolet radiation.

In FIG. 19 where the aluminum coating 42 is removed from fluorescing layer 40 of FIG. 1, it is possible to choose a photocathode layer 40 which is sensitive outside the visible range of light, i.e., red, blue, or green light. In other words, photocathode layer 40 could be sensitive to ultraviolet light. For example, by employing a cesium iodide photocathode layer 40 of FIG. 1, photocathode layer may be operated at a much lower anode voltage, since electrons would not need to penetrate the aluminum. This structure also eliminates the problem of light leakage through pin holes in the removed aluminum coating 42. Since, the photocathode material 40 is blind to the photons depicted in FIG. 2, leaving surface 28 of second optically transparent body 24. The ultraviolet light sensitive cathode 40 of FIG. 19 is physically durable, not being susceptible to chemical aging.

Referring now to FIGS. 21–24, another embodiment 10A of the present invention is depicted. Embodiment 10A includes a photocathode apparatus 210 which differs from embodiment 10 depicted in FIG. 1. Photocathode apparatus includes a backing or substrate 212 which may be a metallic member, such as a woven stainless steel screen coated with cesiated antimony. Substrate 212 may also take the form of semitransparent photocathodes of the thin film type. That is to say, substrate 212 may be a glass material upon which a thin film of cesium has been evaporated. A photocathode coating 214 may be placed on backing member 12. Photons representing the video image may be directed toward layer 214 to produce electrons that are accelerated across vacuum chamber 216, similar to chamber enclosure 32, FIG. 1. The designation "e" represents the electrons produced by photocathode layer 214. The designation "p" represents photons of a video image source. It should be noted that fluorescing layer 218 is also shown. Photocathode layer or coating 214 may take the form of a plated coating of antimony or an antimony based alloy, i.e., antimony steel, antimony silver, and the like. In addition, an antimony layer may react with cesium vapor to produce a cesium-antimony alloy. It should be noted that layer 214 need not be homogenous as is the case with embodiment 10 depicted in FIG. 1. In certain cases, the antimony or antimony alloy may be formed directly as substrate 212, i.e., a unitary member.

As noted above, fluorescing layer 218 is also found within chamber 16 and lies atop optically transparent body 220 which permits viewing on side 222 thereof. The source of electrical power 224 produces a voltage potential between photocathode layer 214 and fluorescing layer 218. Such voltage may be in the range of 1–30 kilo volts.

Figure 22:
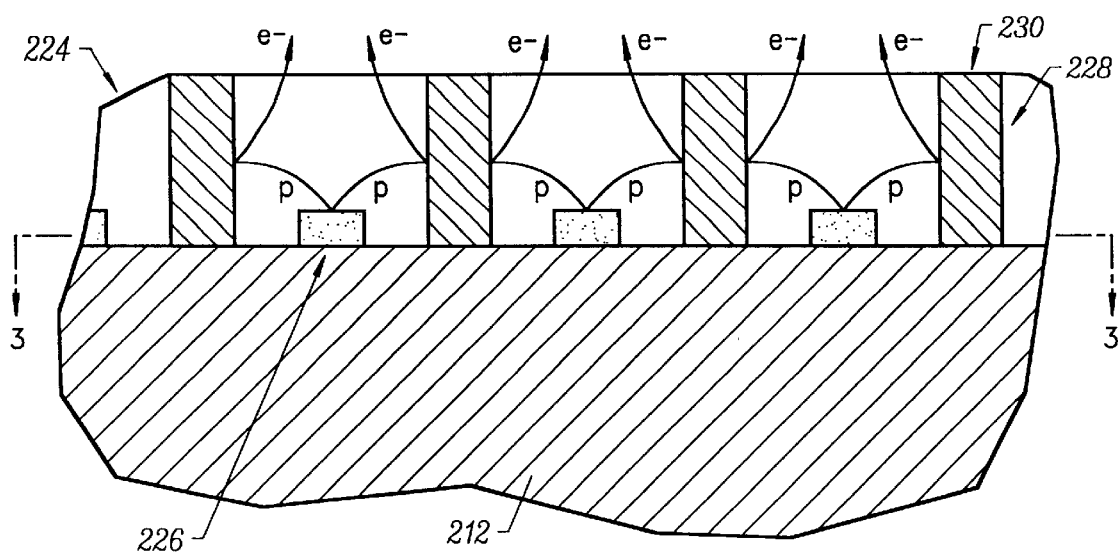
FIG. 22 is a schematic sectional view of the substrate, video image source, and photocathode elements of the embodiment of FIG. 21.
Figure 23:
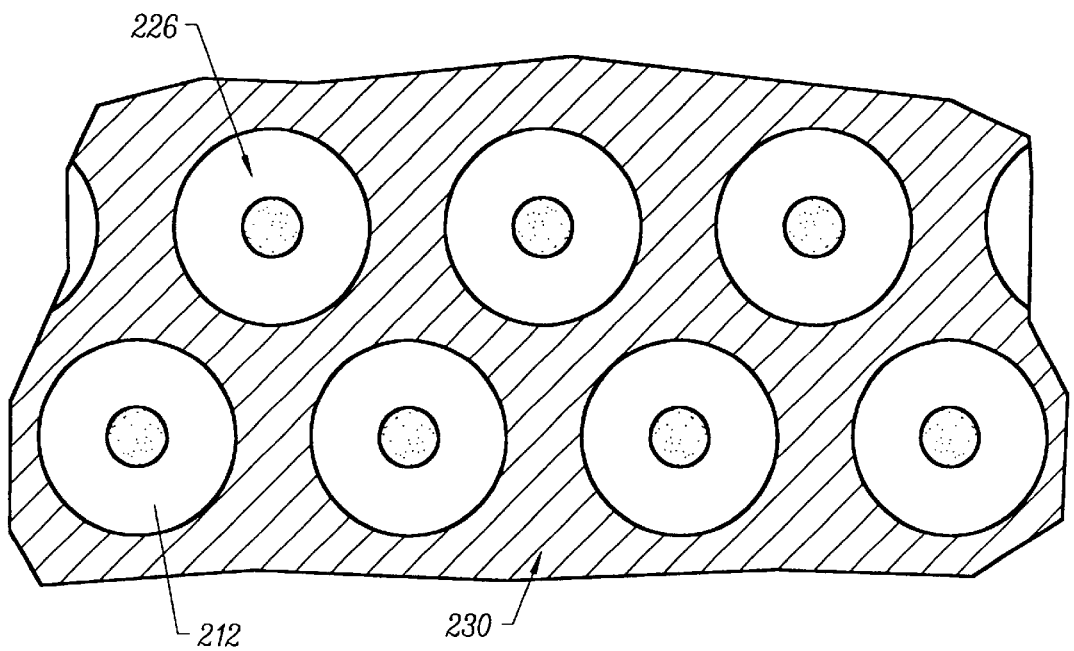
FIG. 23 is a sectional view taken along line 3—3 of FIG. 2.

Turning now to FIG. 22, it may be observed that substrate 212 may include a photocathode apparatus 224 having a plurality of photon producing elements comprising the video image source 228. For example, plurality of elements 226 may take the form of an electroluminescent phosphor of zinc sulfide material doped with manganese. In addition, elements 226 may be formed of gas plasma envelopes. Of course, the photon producing elements 226 are electronically linked to a video image such as video source 12, FIG. 1. A plurality of photocathode elements 230 are also shown in FIG. 22. Each photocathode element of plurality of photocathode elements 230 essentially convert photons from any photon producing element 226 into an electron which is accelerated across chamber 216. Each photocathode element may take the form of an antimony-based material similar to photocathode coating 214 of FIG. 21. Each photocathode element may be constructed of such material or be composed of a base material having a coating of photocathode material thereover. With reference to FIG. 23 it may be observed that plurality of photon producing elements 226 and photocathode elements 230 are formed into a "Swiss cheese" type of arrangement. In such case, photocathode elements 230 would be a contiguous member.

Figure 24:
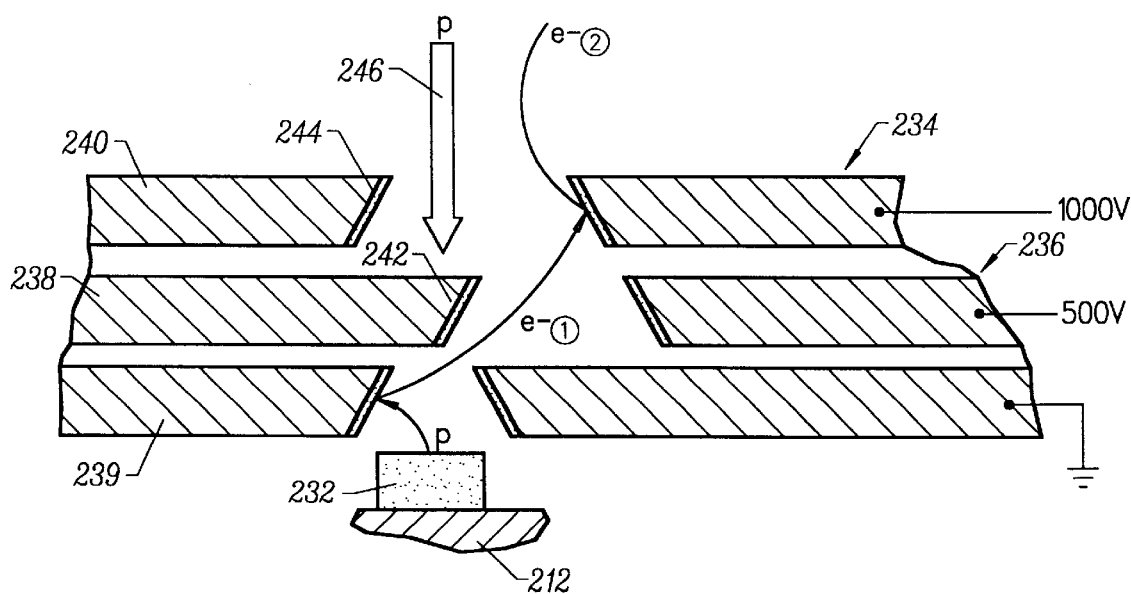
FIG. 24 is a schematic sectional view depicting the addition of photon baffle and channel multiplier means to the embodiment of FIG. 21.

With reference to FIG. 24, a typical photon producing element 232 is shown. Photon producing element 232 is used in conjunction with baffles 234 and channel multipliers 236, known in the prior art. Dynodes 238, 239, and 240 include end surfaces, such as end surface 242 and 244, which shelter photon producing elements 232 from returning photons from fluorescing layer 218 of FIG. 21. Directional arrow 246 represents such returning photons. Photocathode material, e.g., cesium-antimony, are coated on the ends of dynodes 238, 239, and 240 to convert photons emanating from photon producing element 232 into primary electrons, denoted with a "1" having a circle about it on FIG. 24. Secondary electrons, denoted by the number "2" with a circle about it, are also produced in this arrangement. Typical potentials are shown in FIG. 24 for dynodes 238, 239, and 240. The use of the baffles 234 and channel multiplier means 236 eliminates the need for a metallic coating on phosphor layer or screen 218. Also, voltage source 224 between photocathode coating 214 of FIG. 21 or photocathode elements 230 of FIG. 22, and fluorescing layer 218 is relatively low, since the electrons bridging the gap of vacuum chamber 216 need not be propelled through metallic material or a metallic mirror overlying fluorescing layer 218. Also, positive ions returning from the phosphor screen 218 will not damage the photocathode element 230 by impact.

In operation, the user utilizes a video source 12, by remote projection or by close coupling, which may be the output of a cathode ray tube, liquid crystal display (LCD) and the like onto a video image intensifier 14 such as that shown in FIG. 1. The photons of the video source impinge on video image intensifier 14. The video image intensifier is motivated by a potential in the form of a source of electrical power 44 to accelerate photoelectrons across a gap or vacuum enclosure 32. Photons from video source 12 are transduced into such photoelectrons by photocathode layer 38 found first optically transparent body of video image intensifier 14. The embodiment 10A, generates photoelectrons from a video source 12 using an opaque substrate 212. Fluorescing layer 40 on second optically transparent body 24 of video image intensifier 14 receives the greatly accelerated photoelectrons and produces a video image which is viewable on second surface 28 of se con d optically transparent body 24. The system of the present invention may be employed to intensify monochromatic video sources, to produce a color image from a color coded monochromatic video source, or a color video source. System 10 may be employed to produce a flat panel display exhibiting the Lambertian characteristics of a cathode ray tube, without the disadvantage of depth required for the cathode ray tube, i.e., a flat panel display.

Figure 20:
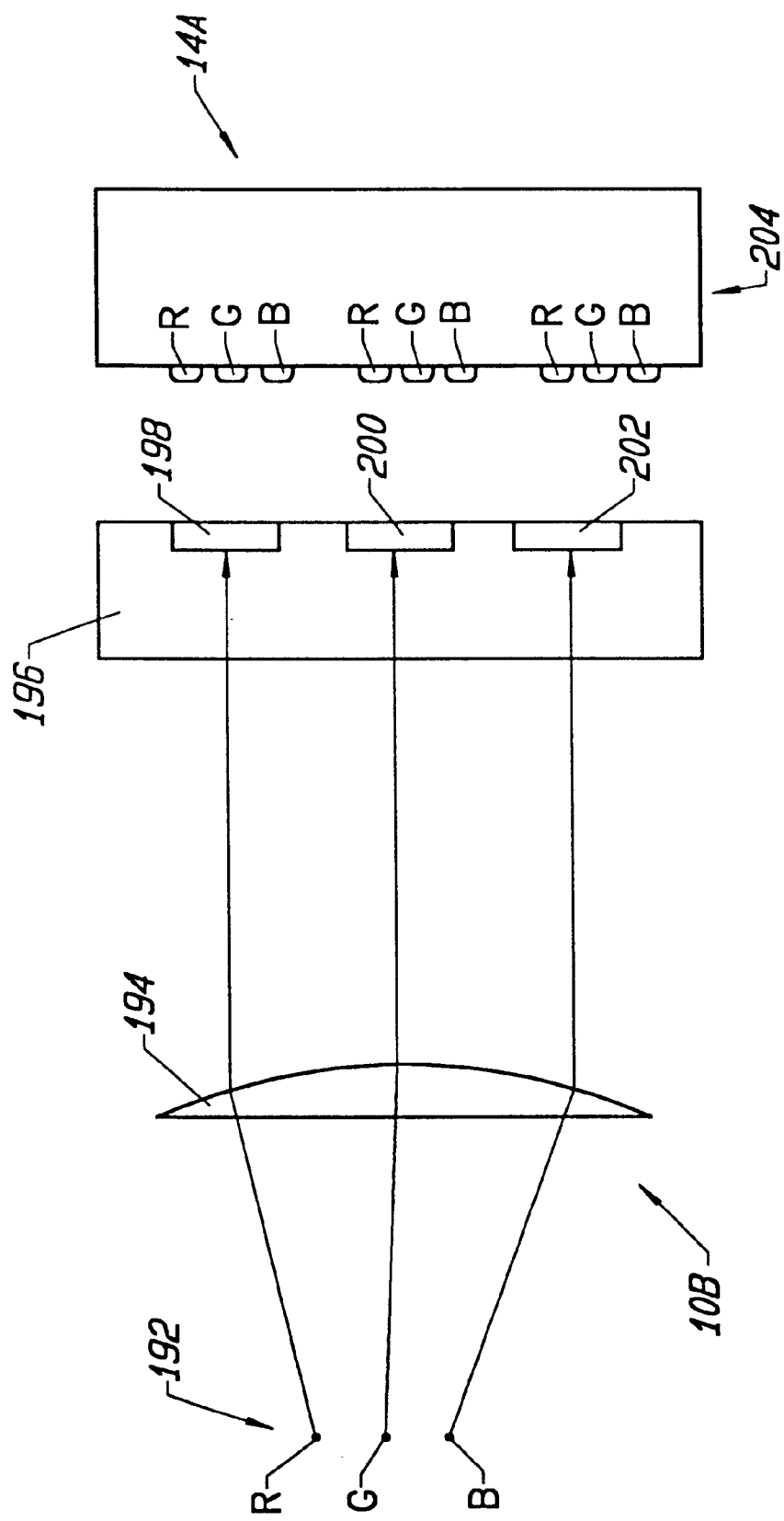
FIG. 20 is a schematic view of another embodiment of the system of the present invention.
Figure 21:
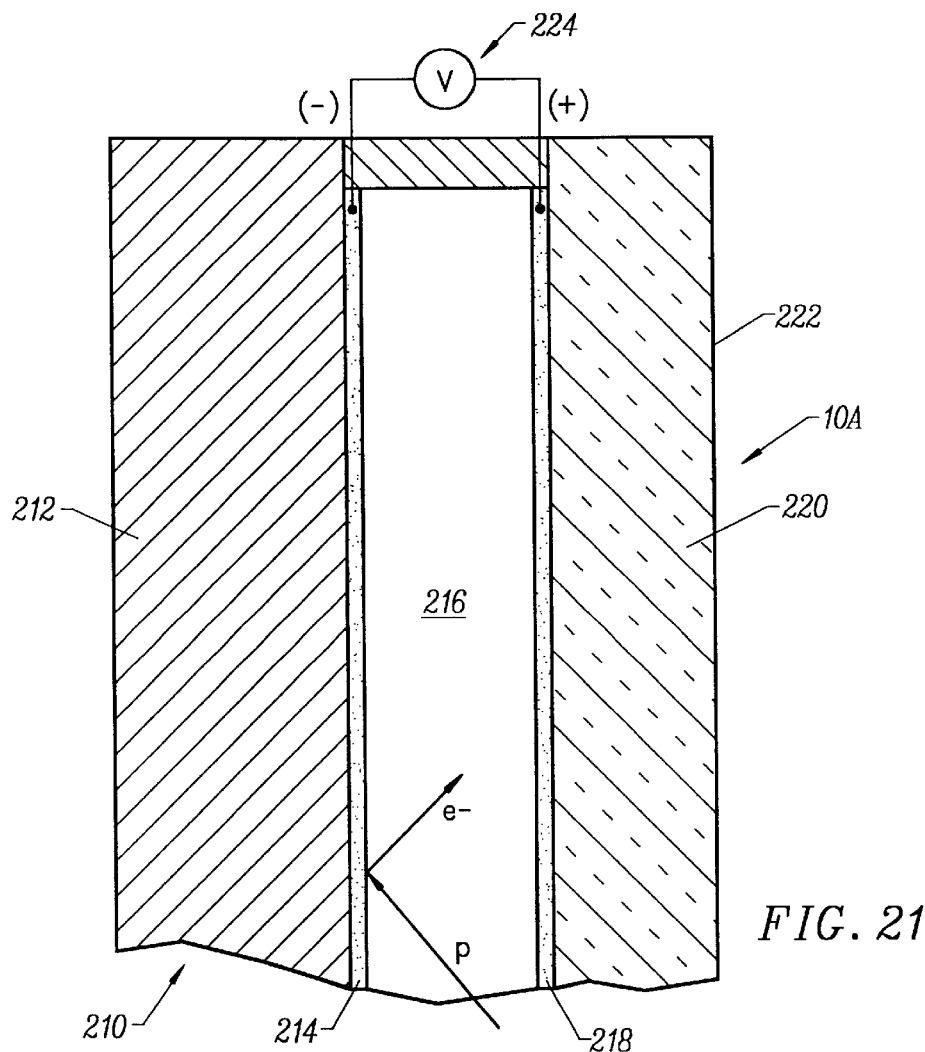
FIG. 21 is a schematic sectional view showing another embodiment of the present invention.

FIG. 20 represents a system 10B in which a high resolution color image is obtained using a low resolution light modulator in conjunction with three point light sources 192, each of different color, labeled R, G, & B for red, green, and blue. Point light sources represent light emitting diodes (LEDS) in the embodiment of FIG. 20. Collimating lens 194 passes light from LEDS 194 to a monochrome light modulator (LCD) 196 of low resolution. Pixels 198, 200, and 202 each represent one pixel of the monochrome light modulator 196. Intensifier 14A is similar in construction to intensifier 14 accepting the inclusion of a plurality of color filters 204, labeled R, G, or B in accordance with the colors of point light sources 192. Three sequential screens are created in the system 10B by sequentially shining the red, green, and blue light video data portions from sources 192. During each color frame, modulator 196 is driven with color data for a particular color frame. Wrong data is prevented from reaching the photocathode of intensifier 14A by plurality of color filters 204, which are arranged in triads of color (R, B, and G) in front of each pixel 198, 200, and 202 of LCD 196. In FIG. 20, only green light of the video data is shown to reach intensifier 14A. The same is true for red and blue light of the video data from sources 197. Of course, the colors red, blue, and green (R, B, and G) are arbitrarily chosen in FIG. 20.

While in the foregoing, embodiments of the present invention have been set forth in considerable detail for the purposes of making a complete disclosure of the invention, it may be apparent to those of skill in the art that numerous changes may be made in such details without departing from the spirit and principles of the invention.

What is claimed is:

1. A video display system comprising:
   a. a video image source;
   b. an image intensifier including a substrate, the video image source providing a photon signal at said substrate;
   c. a photocathode element positioned adjacent said video image source;
   d. an optically transparent body, said optically transparent body including a first side and a second side;
   e. a fluorescing element positioned on said first side of said optically transparent body;
   f. photon baffle means for sheltering said photocathode element from photons being returned thereto, said photon baffle means including a plurality of dynodes spaced from one another to form a gap to permit egress of photons from said photo cathode element, said plurality of dynodes overlapping one another to prevent passage of photons from said fluorescing element; and
   g. chamber means for forming a vacuum enclosure between said substrate and said first side of said optically transparent body.

2. The system of claim 1 in which said substrate is optically opaque.

3. The system of claim 1 in which said video image source includes a plurality of pixels located on said substrate and further comprises video data means linked to said plurality of pixels to generate a video image thereat.

4. The system of claim 3 in which said plurality of pixels are electroluminescent devices.

5. The system of claim 3 in which said plurality of pixels comprise envelopes containing gaseous plasma.

6. The system of claim 1 in which said video image source includes video position data.

7. The system of claim 1 in which said video image source includes video intensity data.

8. The system of claim 1 which additionally comprises channel multiplier means used in conjunction with said photocathode element.

9. The system of claim 8 which additionally comprises photon baffle means used in conjunction with said photocathode element.

10. The system of claim 8 in which said channel multiplier means includes a surface having a photocathode material.

* * * * *